Dec. 17, 1935.  M. NYSTROM  2,024,869
APPARATUS FOR MOTION PICTURES
Filed May 29, 1931   6 Sheets-Sheet 1

INVENTOR
Martin Nystrom
BY
Harris D Hineline,
ATTORNEY

Dec. 17, 1935.  M. NYSTROM  2,024,869
APPARATUS FOR MOTION PICTURES
Filed May 29, 1931  6 Sheets-Sheet 2

INVENTOR
Martin Nystrom
BY
ATTORNEY

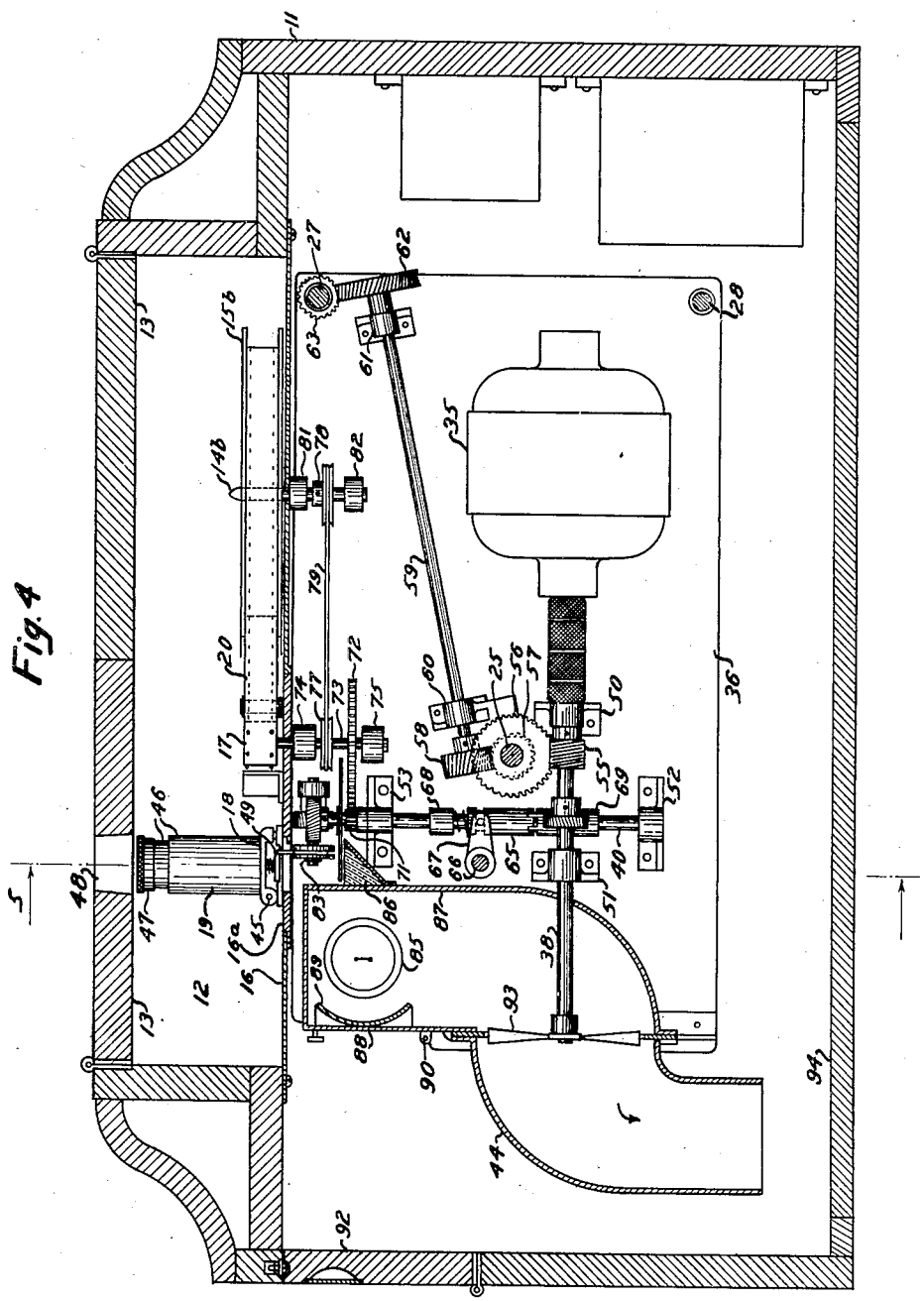

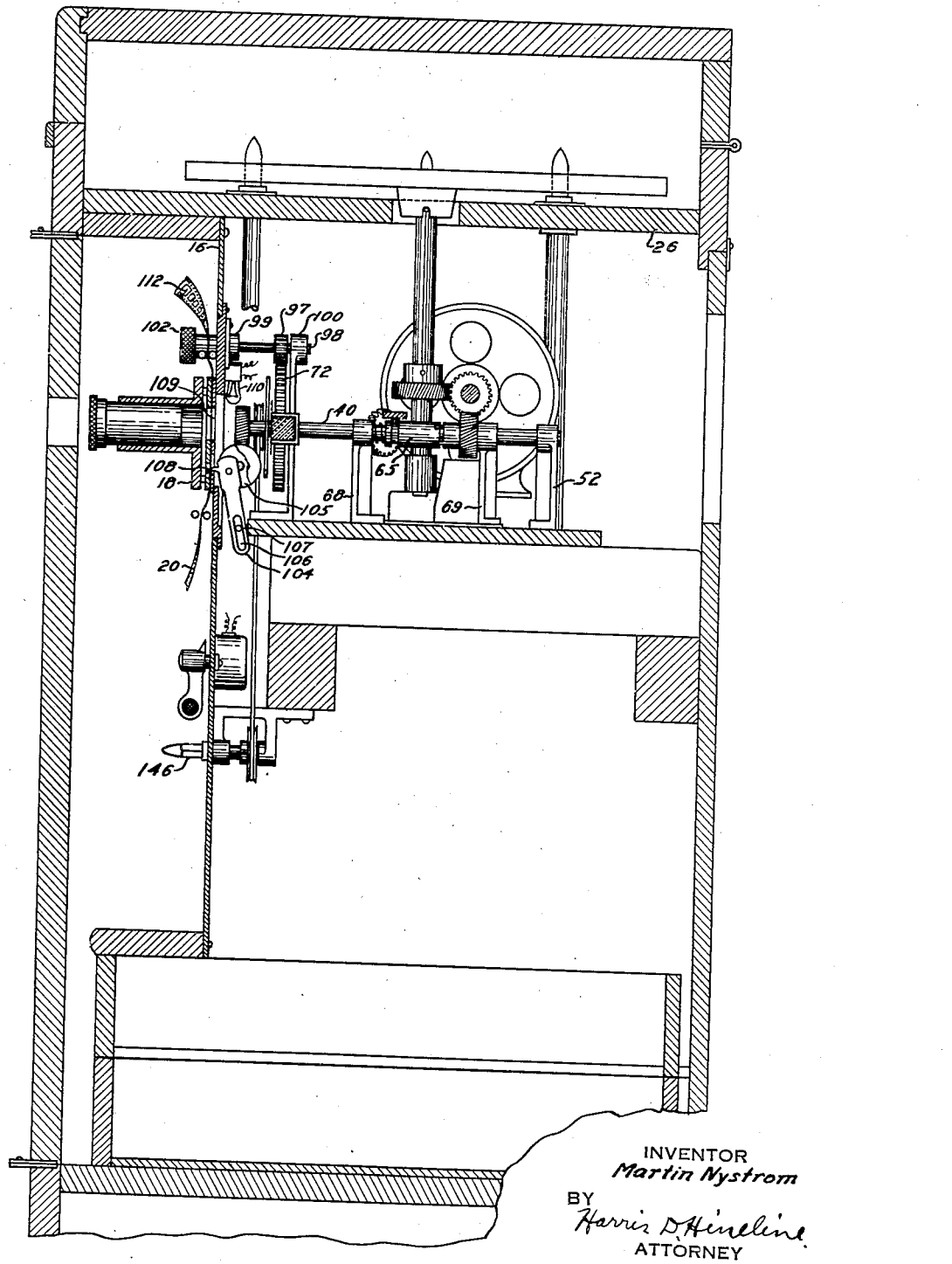

Dec. 17, 1935.  M. NYSTROM  2,024,869
APPARATUS FOR MOTION PICTURES
Filed May 29, 1931   6 Sheets-Sheet 5

INVENTOR
Martin Nystrom
BY
Harris D Hineline
ATTORNEY

Dec. 17, 1935.  M. NYSTROM  2,024,869
APPARATUS FOR MOTION PICTURES
Filed May 29, 1931  6 Sheets-Sheet 6

INVENTOR
Martin Nystrom
BY
ATTORNEY

Patented Dec. 17, 1935

2,024,869

UNITED STATES PATENT OFFICE 2,024,869

APPARATUS FOR MOTION PICTURES

Martin Nystrom, Chicago, Ill., assignor to United Research Corporation, Queens County, N. Y., a corporation of Delaware Application May 29, 1931, Serial No. 540,894

8 Claims. (Cl. 88—17)

This invention relates to motion picture apparatus, and more particularly to motion picture apparatus whereby pictures are projected from a cabinet either with or without synchronous sound accompaniment, the sound being reproduced from records by the apparatus in cooperation with an ordinary radio broadcast receiving set, and wherein novel arrangements of motion picture and sound apparatus are employed.

An object of this invention is to project a motion picture from a film in a direction which is substantially perpendicular to the plane of the film carrying and moving apparatus.

Another object is to make readily accessible from a position in front of a cabinet, from the front of which motion pictures are projected, such portions of the motion picture apparatus which need to be frequently changed, adjusted or manipulated.

A further object is to operate sound reproducing apparatus disposed in the top of the above mentioned cabinet in synchronism with said motion picture apparatus.

Another object of this invention is to unwind a film from a reel with the pictures thereon orientated in a given direction and to project the pictures substantially at right angles to this direction and in an upright position.

Another object is to make accessible, adjacent a phonograph turntable, means for supporting film carrying reels for rewinding purposes, and to drive the turntable and at least one reel from a common source of power.

One or more of the foregoing objects are accomplished by arranging film carrying means, film moving means and a picture gate in a substantially vertical plane near the front of a cabinet, and by giving the film a quarter twist between the gate and the film moving means; and by arranging sound reproducing apparatus, such as a phonograph turntable and pick-up device in a horizontal position near the top of the cabinet, together with means for rewinding films disposed in substantially the same horizontal plane as the sound apparatus and by providing driving means common to all of said apparatus, having a definite speed ratio between the sound reproducing and the projecting mechanisms.

It is also an object of this invention to project motion pictures from apparatus mounted in a cabinet while the doors of the cabinet are closed. This is accomplished by providing an aperture in the door of the cabinet which cooperates with the motion picture projecting apparatus in the cabinet so that the pictures are projected through the aperture.

Still another object of this invention is to effect a combination of motion picture projecting and sound reproducing apparatus and a radio broadcast receiving set with a screen whereby the radio broadcast receiving set may cooperate with the said apparatus to amplify and reproduce sound records in synchronism with the projection of motion pictures on the screen. This is accomplished by disposing a cabinet, containing the projecting and sound reproducing apparatus, a substantial distance away from a broadcast receiving set and facing said set so that motion pictures may be projected to a screen adjacent the receiving set, and connecting the output of sound apparatus with the audio frequency amplifier of the receiving set whereby said output is amplified and reproduced as sound by the loud speaker of the receiving set. Synchronism is obtained by common driving means for the picture projecting and sound reproducing apparatus.

Another object is to frame a picture in a film gate and to adjust the position of a film in the gate so that a starting mark on the film and a starting mark on a sound record are placed in desired relative positions. This is accomplished by providing corresponding starting marks on a sound record and a picture film, providing means connected with the operating mechanism of the film gate for manually moving the film through the gate until the starting mark is in the desired position and placing the pick-up or other sound reproducing device at the starting mark on the sound record.

Another object is to provide room for film feeding mechanism adjacent the film gate in motion picture apparatus. This is accomplished by placing a light source for the film gate at one side of the gate, placing the film feeding mechanism at the other side of the gate and by providing means between the light source and the mechanism for directing light from the source through the gate.

Still another object is to prevent the heat generated by a source of light in motion picture apparatus from unduly raising the temperature of other parts of the apparatus. This is accomplished by ventilating the source of light and operating the ventilating means by the same motor which operates the motion picture mechanism.

Other and further objects will be apparent as the description proceeds, reference now being had to the figures of the accompanying drawings illustrating the preferred embodiment of the invention and in which:

Fig. 4 is a view, partly in section, of the cabinet and apparatus taken on line 4—4 of Fig. 3 in the direction of the arrows;

Fig. 5 is a vertical cross section of the cabinet and the apparatus therein taken on line 5—5 of Fig. 4 in the direction of the arrows;

Figure 1:
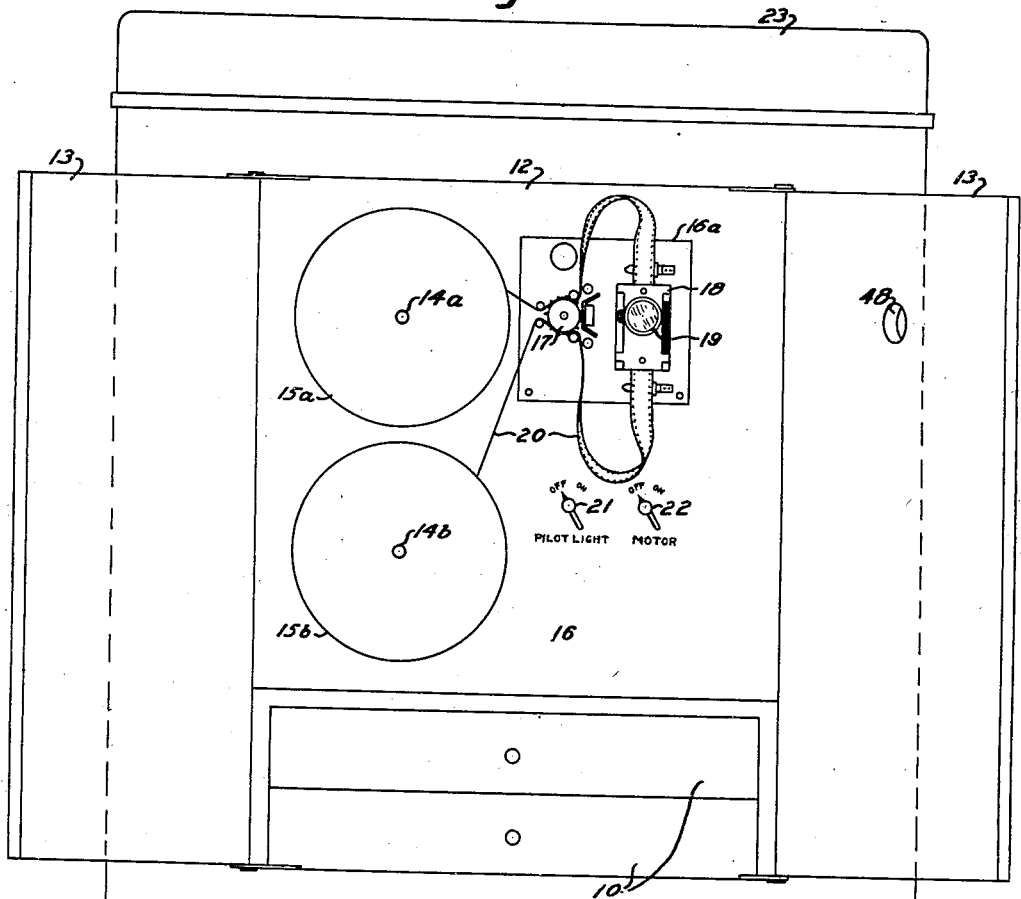
Fig. 1 represents a front view of a cabinet with the doors open showing film carrying reels, film sprocket and picture gate arranged substantially in a vertical plane.

Referring to Fig. 1, reference character 11 indicates a cabinet which may be of any suitable size or design having an opening 12 in the front thereof, provided with suitable doors 13. In the opening 12 and accessible from the front of the cabinet are supports 14a and 14b for film carrying reels 15a and 15b, preferably in the form of spindles or shafts disposed perpendicularly to the front of the cabinet. The spindles 14a and 14b may be supported by and extend through a panel 16, which extends across the rear of the opening 12. Film moving means, such as sprocket 17, and a film gate 18 are disposed in front of the panel 16, the shaft of the sprocket extending through the panel. Sprocket 17 and gate 18 may be supported by panel 16 or by a sub-panel 16a secured to the larger panel 16, or they may be supported by means in back of the panel. A projecting lens 19 is disposed over an aperture in the film gate 18. When a film 20 is unwound from reel 15a on spindle 14a and engages sprocket 17 its surface is substantially perpendicular to panel 16. In accordance with this invention, the film is given a quarter or 90° twist to make its surface parallel to panel 16 for passage through film gate 18. The film is then twisted so that its surface is again perpendicular to the panel for re-engaging sprocket 17 and may be wound on a reel 15b supported and driven by spindle 14b. A reel adapted to simultaneously unwind and wind the film may be used instead of separate reels 15a and 15b. Operating switches, such as 21 and 22, may be supported on another portion of the panel 16. The top of the cabinet 11 is closed by a cover 23 which may be hinged to the back edge of the cabinet. At the lower part of the front of the cabinet drawers 10 provide space for storing extra reels and phonograph records. Further details of the apparatus shown in Fig. 1 will be described in connection with the other figures of the drawings.

Figure 2:
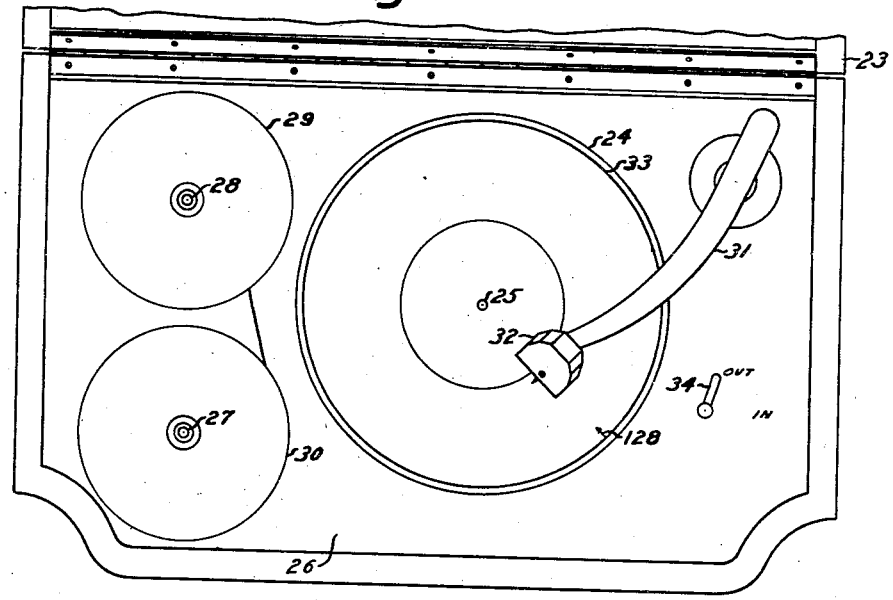
Fig. 2 is a plan view of the top of the cabinet of Fig. 1, with the cover open, showing sound reproducing and film rewinding apparatus.

In Fig. 2 the cover 23 of the cabinet has been thrown back disclosing a phonograph turntable 24 supported and operated by a shaft 25. A suitable shelf 26 is disposed under the turntable and serves to support or guide spindles 27 and 28 which are adapted to support film carrying reels, such as 29 and 30. An arm 31 may be pivotally supported on the shelf 26 and carries a pickup device or reproducer 32 in operative relation to a phonograph record 33 on the turntable 24. A lever 34, adapted to operate a clutch inside the cabinet, is disposed on the upper side of the panel 26.

Figure 3:
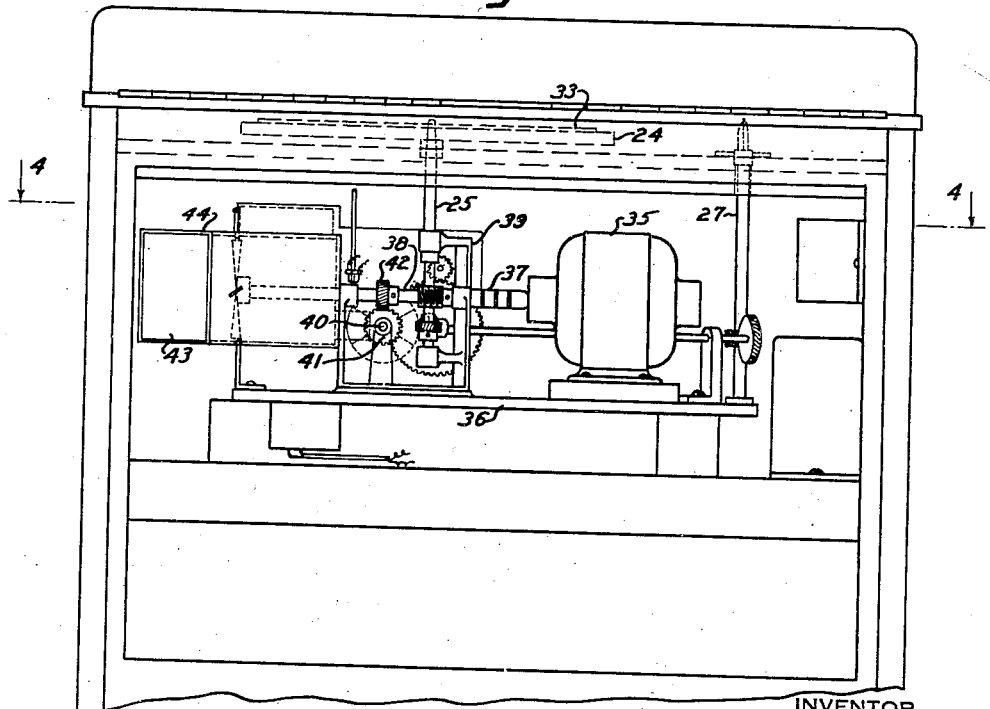
Fig. 3 is a view of the back of the cabinet with the back wall removed and shows the driving motor with several parts of the apparatus installed in the cabinet.

Fig. 3 illustrates some of the apparatus in the cabinet from the rear thereof. A motor 35, preferably of constant speed, is mounted on a suitable support or shelf 36 which is secured to other supports in the cabinet. The shaft of the motor is connected by a flexible coupling 37 to a horizontal drive shaft 38. Through this shaft the motor 35 serves as a common source of mechanical power for the apparatus in the cabinet. In Fig. 3, the shaft 25 for the phonograph turntable 24 and spindle 27, both preferably vertical, are clearly shown, also a support 39 for shaft 25. A cross shaft 40 provided with a gear 41 is disposed at right angles to shaft 38 and is driven by a gear 42 on shaft 38. Reference character 43 indicates the back opening of a ventilating conduit 44, which will be described later.

Most of the apparatus described in connection with Figs. 1, 2 and 3 is clearly shown in the horizontal cross sectional view, Fig. 4. The opening 12 in the front of cabinet 11 is made deep enough to accommodate the apparatus disposed in front of panel 16 and behind doors 13. Projecting lens 19 is preferably secured directly to film gate 18, which may be hinged to panel 16, as indicated at 45. Projecting lens 19 comprises a housing with a suitable number of individual lens elements 46 secured in an adjustable portion 47 thereof for focusing the projected pictures. Lens 19 is arranged to cooperate with an opening 48 in one of the doors 13 so that the doors of the cabinet may be kept closed while motion pictures are being projected through lens 19. This is a desirable arrangement because the closing of the cabinet confines to the interior thereof much of the noise made by the apparatus when in operation. Other openings in cabinet 11 may be provided with doors or covers. The film gate 18 is provided with a presser pad 49 of usual construction. Lens 19 and suitable picture openings in film gate 18, presser pad 49 and panel 16 (or sub-panel 16a) are all aligned when the gate and projecting lens are in the position shown in Fig. 4. The gate, presser pad and lens may be swung to one side on the hinge 45 when threading the film 20.

Bearing supports 50 and 51 are provided for drive shaft 38 and similar supports 52 and 53 are provided for cross shaft 40, all of the supports 50 to 53, inclusive, being preferably positioned on shelf 36. A worm 55 on shaft 38 drives a gear 56 secured to turntable shaft 25, on which is also secured gear 57 which meshes with a gear 58 on shaft 59, the latter being supported on shelf 36 by means of bearing supports 60 and 61. A gear 62 secured to shaft 59 meshes with a gear 63 secured to rewinding spindle 27. It will be observed, therefore, that the worm 55, which rotates at the speed of the motor 35, serves to drive both the turntable shaft 25 and the rewind shaft 28. Spindle 28 need not be driven as it serves merely to support a reel from which film is unwound.

Cross shaft 40 is divided, the two parts thereof being connected by clutch mechanism 65 which may be thrown in or out by means of lever 34 (Fig. 2) acting through shaft 66 and lever 67. Additional bearing supports 68 and 69 (Fig. 5) are provided for shaft 40, one on each side of the clutch mechanism. A pinion 71 is secured to the driven part of shaft 40 adjacent bearing 53 and meshes with a gear 72 secured on shaft 73 which extends through panel 16 and carries sprocket 17, thereby driving the shaft and the sprocket. Shaft 73 is supported in bearings 74 and 75 and also carries a pulley 77 which drives a pulley 78 by means of a belt 79. Pulley 78 is secured to spindle 14b and, because of the slipping of belt 79, permits variable rotation of spindle 14b according to the amount of film on reel 15b. Spindle 14b is supported in bearings 81 and 82 which may be carried by panel 16 or some other support in the cabinet.

Cross shaft 40 also drives the intermittent film mechanism, indicated generally at 83, which will be described in connection with Fig. 5. It will be noted that cross shaft 40 and the mechanism 83 are disposed closely adjacent the film gate 18 and that it would be difficult and troublesome to place a projecting lamp in alignment with the film gate 18 and projecting lens 19. In view of this difficulty and in accordance with this invention, projecting lamp 85 is disposed at one side of the film gate 18 and reflecting means, such as a prism 86 which occupies considerably less space than a projecting lamp, is disposed in alignment with the lens 19 and the lamp 85 so that light from the lamp is reflected by the prism 86 and directed through the lens. A suitable housing 87 is provided for the projecting lamp 85 and is connected with ventilating conduit 44. A door 88 is provided in the housing 87 to give access to lamp 85 and may have on its inner side a reflector 89 suitably disposed in relation to lamp 85 to confine a large portion of the light emitted by lamp 85 to a small area on prism 86, and therefore, on the picture aperture in film gate 18. Door 88 may be hinged to the wall of lamp housing 87, as indicated at 90, and in alignment therewith a door 92 is provided in a side wall of the cabinet to give access to door 88 and lamp 85. Drive shaft 38 passes through the wall of housing 87 and secured thereto is a fan 93 adapted to exhaust air from the housing 87 and force it through the conduit 44 to the exterior of the cabinet. Motor 35 drives ventilating fan 93 by means of shaft 38 and thereby in cooperation with housing 87 and conduit 44 serves to prevent the heat of lamp 85 from unduly raising the temperature of other apparatus in the cabinet. A large opening 94 is provided in the back of the cabinet and is preferably covered by a panel or door 95 having an opening therein aligned with the opening 43 of ventilating conduit 44.

In Fig. 5, gear 72 is shown meshing with pinion 97 on a shaft 98 which is supported by bearings 99 and 100 and which passes through panel 16. A knob or finger wheel 102 is secured to that end of shaft 98 which projects through panel 16. By means of this knob 102 all of the mechanism which is driven by cross shaft 40 may be operated manually when clutch 65 is disengaged, thereby permitting the film mechanism to be adjusted independently of the sound reproducing mechanism.

The intermittent film moving mechanism 83 (Fig. 4) is clearly shown in Fig. 5 and comprises a link 104 eccentrically positioned on a rotatable disc 105 and having a slot therein indicated by reference character 106. A stationary pin 107 passes through slot 106 and serves to confine the motion of the lower end of lever 104 to a reciprocating movement in a substantially vertical direction. Rotation of disc 105 gives the upper part of lever 104 a substantially circular motion in a plane perpendicular to panel 16. A hook or finger 108 projecting from the edge of lever 104, near the upper end thereof is adapted to engage a sprocket hole in the portion of film 20 which is in the film gate 18. Assuming finger 108 to be engaged near the upper end of its travel with a sprocket hole in film 20, it will be seen that rotation of disc 105 in a counter-clockwise direction will cause finger 108 to draw film 20 through gate 18 and release itself from the sprocket hole near the lower end of its travel. During the upward travel of finger 108 the link 104 is inclined away from panel 16 and does not act upon the film, thereby permitting the film to be at rest while a picture is projected. The mechanism is adapted to move the film one picture space for each revolution of disc 105 and to release finger 108 from the film when a picture is framed in the aperture 109. A small lamp 110 is disposed behind panel 16 adjacent aperture 109 to illuminate the aperture and the film for convenience in threading and initially framing the film by engagement with finger 108, in cooperation with knob 102.

In Fig. 5 a portion of the film 20 is shown threaded through picture gate 18. A starting mark 112 may be placed on the film corresponding to another starting mark 128 on phonograph record 33 (Fig. 2). These marks are disposed on the film at one of the picture frames and on the sound record at the point in the record corresponding to the said picture frame, or at points in advance thereof, the advanced distances being proportioned according to the relative speeds of the film and record. The film 20 may be framed in picture gate 18 by turning knob 102 until the finger 108 is just about to engage the film and then engaging the nearest sprocket hole in the film with finger 108 when a picture frame on the film coincides with the picture aperture in film gate 18; knob 102 may then be turned until starting mark 112 appears in the picture aperture. The performance of these operations is greatly assisted by the illumination provided by lamp 110. With starting mark 112 in the picture aperture, the phonograph record 33 containing the sound accompaniment for the picture on film 20 may be placed on turntable 24 and the needle of the reproducing device placed on starting mark 128 on the record. Clutch 65 is then engaged so that when motor 35 is started the film moving mechanism and the phonograph turntable will start simultaneously and maintain their proper relative speeds due to the positive speed ratio of the gearing by which they are driven.

Figure 6:
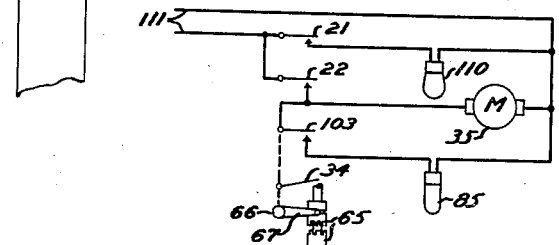
Fig. 6 is a circuit diagram showing how the apparatus may be energized and controlled.

In Fig. 6, lamp 110 is shown electrically connected to switch 21 and may be energized by this switch from a source of electric current 111. Switch 22 is electrically connected to motor 35 for starting and stopping the motor by respectively connecting or disconnecting the motor from source 111. A switch 103 for the projecting lamp 85 may be provided at a convenient point in the cabinet and is preferably operated with or by lever 34 (Fig. 2), which also controls clutch 65 through shaft 66, in such manner that lamp 85 will be disconnected from its current supply when clutch 65 is disengaged. The supply of current for lamp 85 may be obtained from the current supply for motor 35 at a point between motor switch 22 and the motor. It is then possible to energize lamp 85 only when motor 35 is running and clutch 65 is engaged.

Figure 7:
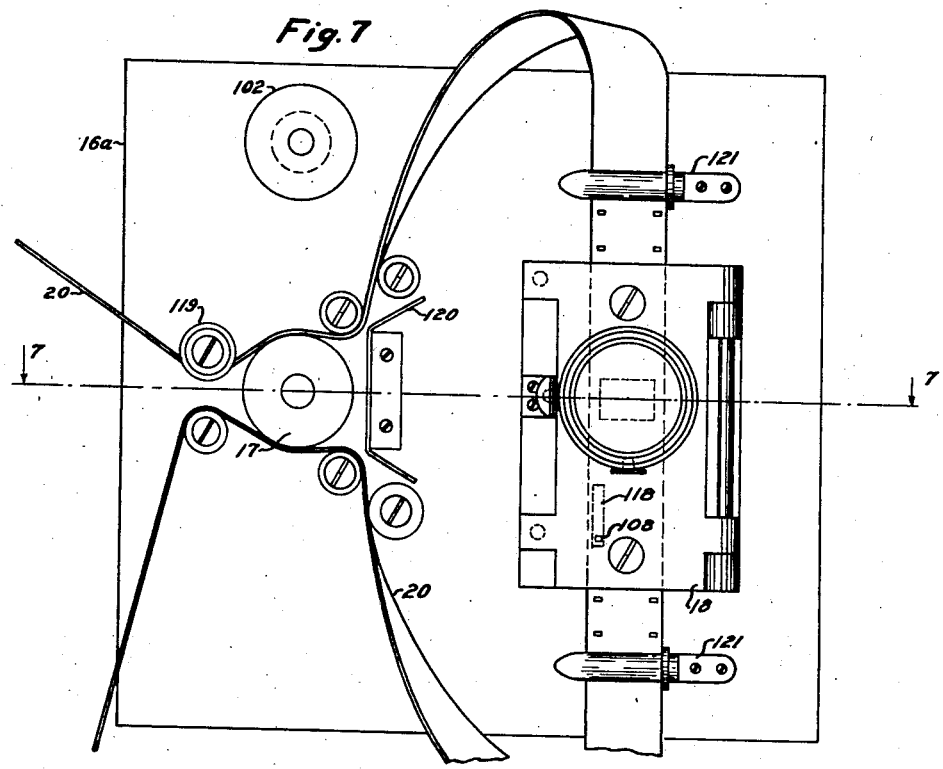
Fig. 7 is a view on a larger scale of the film sprocket and film gate shown in Fig. 1.
Figure 8:
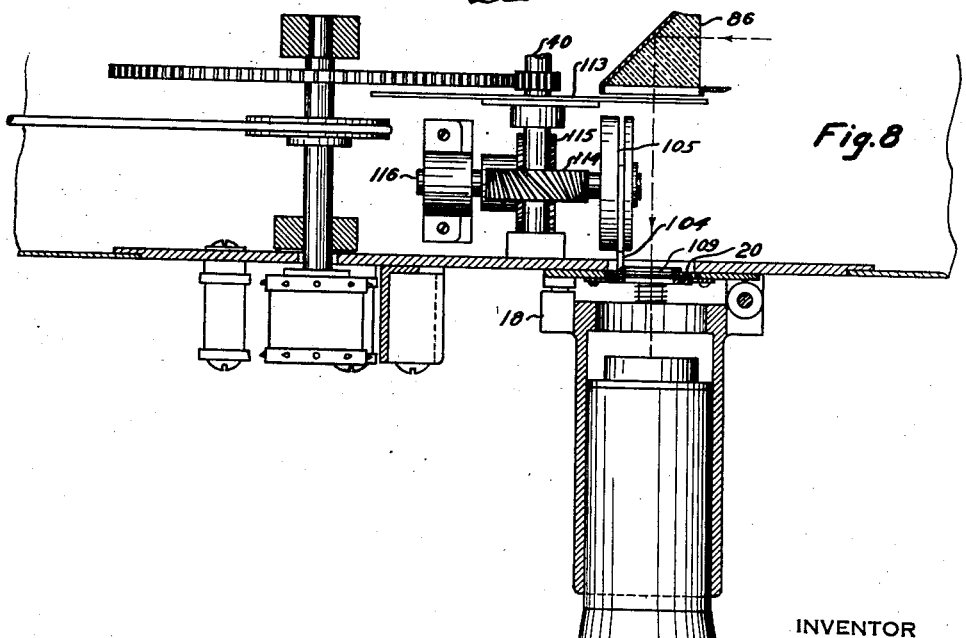
Fig. 8 is a horizontal cross section of the apparatus of Fig. 7 taken on the line 8—8 in the direction of the arrows.

Figs. 7 and 8 show the continuous and intermittent film moving mechanisms to a larger scale. A shutter wheel 113 (Fig. 8) is secured to shaft 40 and is disposed between prism 86 and the film gate 18. Shutter 113 performs the usual function of interrupting the light during the time that film 20 is in motion in the film gate. A gear 114 on shaft 40 meshes with a gear 115 on a shaft 116 disposed under and at right angles to shaft 40 and which is supported in suitable bearings. The disc 105 and link 104, described in connection with Fig. 5, are disposed on one end of shaft 116 and are driven thereby. In Fig. 7, reference character 118 indicates a slot in sub-panel 16a through which finger 108 projects to engage film 20. It will be observed in Fig. 8 that disc 105 may be positioned closely adjacent picture aperture 109 without interfering with the light reflected by prism 86 and projected through the picture aperture.

In the front view of the panel 16 and sub-panel 16a (Fig. 7), sprocket 17 is shown to a larger scale. Cooperating with sprocket 17 are a plurality of pulleys or guide rollers, such as 119, for keeping film 20 in engagement with sprocket 17 and for guiding the film. Separator 120, which may be attached to sub-panel 16a, also helps to guide the film. Additional film guides 121 are provided above and below the film gate 18. Knob or finger wheel 102 for positioning the film 20 is shown directly above sprocket 17.

It may be observed from the drawings that due to the arrangement of the film carrying and film moving mechanisms in a vertical plane near the front of the cabinet 11, all operations which are performed in threading and adjusting the film 20 and in changing films are readily accomplished from a position in front of the cabinet and that the operation of rewinding the film and those concerned with reproducing sound are readily performed from the same position, due to the arrangement of the sound reproducing and rewinding mechanisms near the top of the cabinet; thus, a talking motion picture machine is provided which may be very simply and easily operated.

Figure 9:
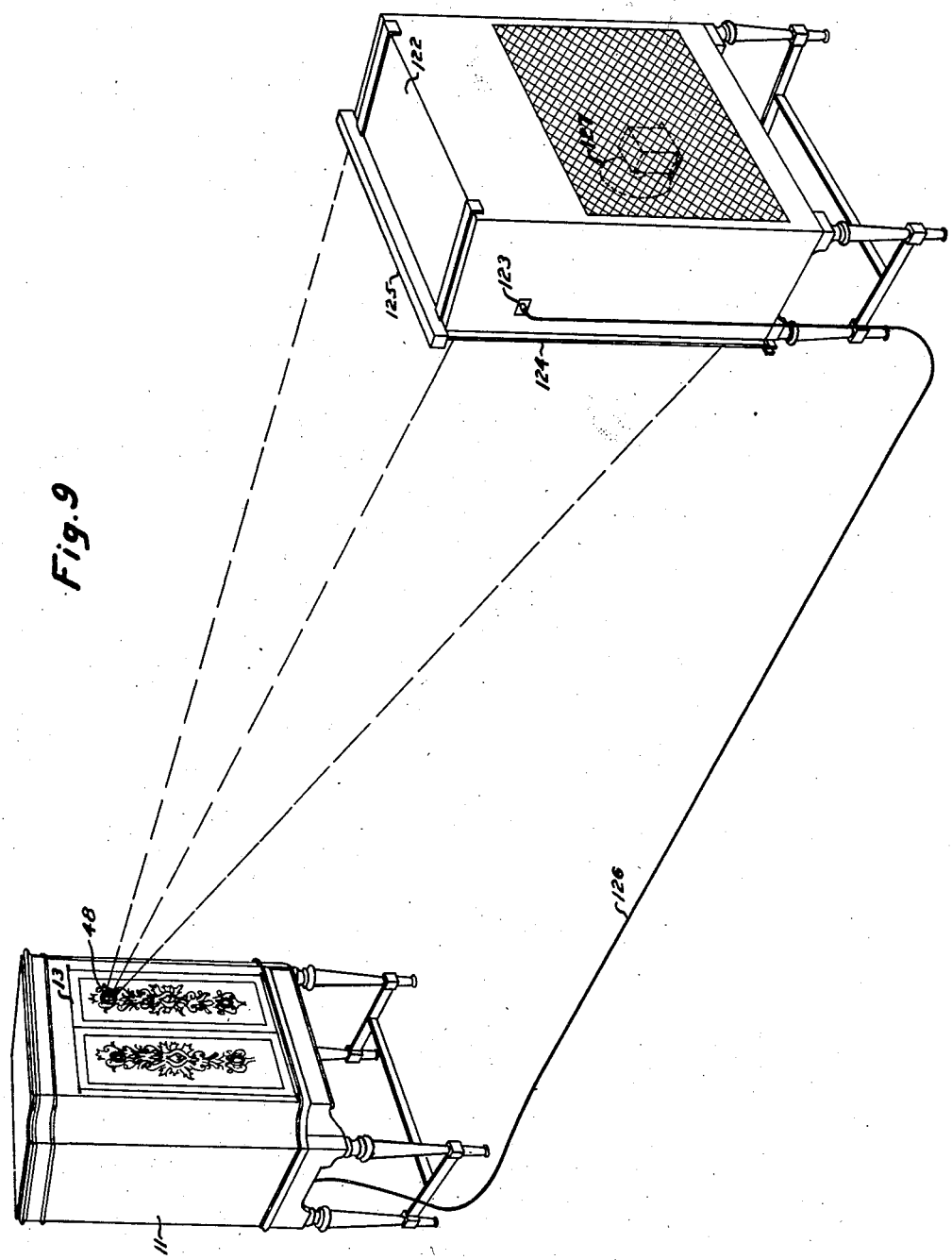
Fig. 9 is a perspective view showing at the left of the figure a cabinet containing apparatus similar to that shown in Figs. 1 to 8, inclusive and, at the right, an ordinary radio broadcast receiving set with a screen.

The receiving set 122 illustrated in Fig. 9 is of an ordinary type and should comprise an audio frequency amplifier (not shown), a loud speaker 127 and a phonograph jack 123 or other suitable means for connecting the output of a sound reproducing device, such as an electrical pickup, to the input of the audio frequency amplifier, whereby the electric current obtained through the medium of a sound record may be amplified and reproduced as sound from the loud speaker, as is well known in the art. According to the present invention such a receiving set 122 is provided with a screen 124 suitable for the projection of pictures thereon and preferably attached to the front of the receiving set. Screen 124 may be made similar to a window shade so that it can be rolled up in a suitable container 125 secured to the top of the receiving set. The present invention includes the combination of such a receiving set with the previously described talking motion picture machine, preferably contained in cabinet 11 shown to the left of Fig. 9 and facing receiving set 122. A cable 126 connects the reproducing device 32 in cabinet 11 with the phonograph jack 123 so that a sound record operated by turntable 24 may be reproduced by the loud speaker 127 in the radio receiver, as previously explained. The motion pictures projected by the picture apparatus in cabinet 11 through aperture 48 in one of the doors 13 are focused on screen 124. When the picture apparatus is operated in synchronism with the phonograph record 33 cooperating with loud speaker 127, the illusion is created that sounds are emanating from the pictures projected on screen 124.

It should be understood, of course, that the picture projecting mechanism may be operated alone and that the sound reproducing mechanism in combination with the radio set may be operated without the motion pictures.

While there is here described but a single embodiment of the device of this invention, it is adapted to still other modifications therefrom without departure from the inventive concept disclosed, and it is therefore desired that only such limitations shall be imposed upon the appended claims as are stated therein or required by the prior art.

I claim:

1. Motion picture apparatus comprising a panel, shafts perpendicular to said panel adapted to support film supply and take-up reels, a film gate disposed over a picture aperture in said panel, a lens carried by said film gate and aligned with the aperture, and means disposed between said film gate and said shafts for moving a film from the supply reel to said film gate and from the film gate to the take-up reel, wherein all the said elements are disposed adjacent said panel and on the same side thereof, a source of light adjacent said film gate and on the opposite side thereof from said means, and means for reflecting light from said source to said film gate.

2. Motion picture apparatus comprising a panel, a film gate disposed over a picture aperture in said panel, a lens aligned with said gate and aperture, means disposed at one side of said gate for moving film toward and from said gate, and means rotatable in a plane parallel to said panel for supplying film to said film-moving means and rewinding said film, wherein all the said elements are disposed adjacent said panel and on the same side thereof, a source of light adjacent said film gate and on the opposite side thereof from said film moving means, and means for reflecting light from said source to said film gate.

3. Motion picture apparatus comprising film supply and takeup reels, a feed sprocket therefor, a film gate for film from said feed sprocket, a panel, means for mounting said film supply and takeup reels, said feed sprocket and said film gate all in substantially the same plane on the front of said panel, a projection lens mounted on said film gate at the front of said panel, a projection lamp for the film from said reels, and means for mounting said projection lamp behind said panel.

4. Motion picture apparatus comprising film supply and takeup reels, a feed sprocket therefor, a film gate for film from said feed sprocket, means for mounting said film supply and takeup reels, said feed sprocket and said film gate all in substantially the same plane, a door overlying said film supply and takeup reels, and a second door overlying said film gate, said doors being in substantially the same plane.

5. Motion picture apparatus comprising film supply and takeup means, a film gate, sprocket means for feeding film between said first mentioned means and said film gate, a projection lens mounted on said film gate with the optical axis thereof substantially parallel to the axis of rotation of said first mentioned means, a panel, means for mounting said first mentioned means and said film gate on the same side of said panel, a source of light and pulldown mechanism for the film from said first mentioned means, and means for mounting said source of light and said pulldown mechanism behind said panel.

6. Motion picture apparatus comprising a cabinet having separable doors mounted to swing on vertical axes and in closed position adapted to lie in substantially the same plane, said cabinet having a front vertical panel behind and closely adjacent to said doors when in closed position, the space between said doors in closed position and the front of said panel comprising a compartment, means for mounting in said compartment on the front of said panel film supply and takeup reels for rotation about horizontal axes, a film gate having a projection lens thereon, means for mounting said film gate on the front of said panel with the optical axis of said projection lens parallel to the axes of rotation of said reels, film feeding means between said reels and said film gate and mounted on the front of said panel, pulldown mechanism and a source of light for said film behind said panel, one of said doors in closed position overlying said film supply and takeup reels and another of said doors in closed position overlying said film gate, whereby said doors in open position expose said film supply and takeup reels and said film gate substantially at the front of said cabinet.

7. Motion picture apparatus comprising a cabinet having separable doors mounted to swing on vertical axes and in closed position adapted to lie in substantially the same plane, said cabinet having a front vertical panel behind and closely adjacent to said doors when in closed position, the space between said doors in closed position and the front of said panel comprising a compartment, means for mounting in said compartment on the front of said panel film supply and takeup reels for rotation about horizontal axes, a film gate having a projection lens thereon, means for mounting said film gate on the front of said panel with the optical axis of said projection lens parallel to the axes of rotation of said reels, film feeding means between said reels and said film gate and mounted on the front of said panel, pulldown mechanism and a source of light for said film behind said panel, one of said doors in closed position overlying said film supply and takeup reels and another of said doors in closed position overlying said film gate, whereby said doors in open position expose said film supply and takeup reels and said film gate substantially at the front of said cabinet, said last mentioned door in closed position having a projection aperture in alignment with said projection lens.

8. Motion picture mechanism comprising a panel, means for supporting film supply and take-up reels in a substantially vertical plane at the front of the vertical plane of said panel, a gate mounted on the front of said panel in substantially the same plane as the plane of said reels and adapted to receive film from said reels whereby the film in being threaded between said reels and said gate is twisted substantially 90°, a driving sprocket on the front of said panel for said film, a lamp for said gate, and means for supporting said lamp on the opposite side of said panel from said gate and said reels.

MARTIN NYSTROM.